US012317017B2

(12) United States Patent
Qin

(10) Patent No.: US 12,317,017 B2
(45) Date of Patent: May 27, 2025

(54) SPEAKER ASSEMBLY AND ELECTRONIC DEVICE

(71) Applicant: VIVO MOBILE COMMUNICATION CO., LTD., Dongguan (CN)

(72) Inventor: Feixiang Qin, Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 246 days.

(21) Appl. No.: 18/096,977

(22) Filed: Jan. 13, 2023

(65) Prior Publication Data

US 2023/0199356 A1 Jun. 22, 2023

Related U.S. Application Data

(63) Continuation of application No. PCT/CN2021/106436, filed on Jul. 15, 2021.

(30) Foreign Application Priority Data

Jul. 15, 2020 (CN) ........................ 202010680148.X

(51) Int. Cl.
*H04R 1/02* (2006.01)

(52) U.S. Cl.
CPC ............. *H04R 1/025* (2013.01); *H04R 1/026* (2013.01)

(58) Field of Classification Search
CPC ........ H04R 1/025; H04R 1/026; H04R 1/021; H04R 1/023; H04R 2499/11; H04R 1/02
See application file for complete search history.

(56) References Cited

U.S. PATENT DOCUMENTS

| | | | |
|---|---|---|---|
| 10,009,682 | B2 | 6/2018 | Schoeffmann et al. |
| 2013/0083957 | A1 | 4/2013 | Soininen et al. |
| 2014/0341419 | A1 | 11/2014 | Risberg et al. |

FOREIGN PATENT DOCUMENTS

| | | | |
|---|---|---|---|
| CN | 109327746 | A | 2/2019 |
| CN | 208489973 | U | 2/2019 |
| CN | 209488764 | U | 10/2019 |
| CN | 210247039 | U | 4/2020 |
| CN | 210578700 | U | 5/2020 |
| CN | 111741385 | A | 10/2020 |
| JP | 2017076962 | A | 4/2017 |

*Primary Examiner* — Tuan D Nguyen
(74) *Attorney, Agent, or Firm* — The Webb Law Firm

(57) ABSTRACT

A speaker assembly includes: a housing, a support mounted to the housing, and a speaker mounted to the support. The housing has a first sound outlet and a first accommodating groove in communication with the first sound outlet through a sound output channel. At least a portion of the support is disposed in the first accommodating groove, a second accommodating groove is disposed at a side of the support away from the first sound outlet, a first opening is disposed at a side of the support close to the first sound outlet, and the second accommodating groove is in communication with the sound output channel through the first opening. At least a portion of the speaker is disposed in the second accommodating groove, the speaker has a second sound outlet, and the second sound outlet is in communication with the first opening.

12 Claims, 4 Drawing Sheets

SPEAKER ASSEMBLY AND ELECTRONIC DEVICE

CROSS-REFERENCE TO RELATED APPLICATIONS

This application is a Bypass Continuation Application of PCT/CN2021/106436 filed Jul. 15, 2021, and claims priority to Chinese Patent Application No. 202010680148.X filed Jul. 15, 2020, the disclosures of which are hereby incorporated by reference in their entireties.

BACKGROUND OF THE INVENTION

Field of the Invention

This application relates to the field of communications technologies, and in particular, to a speaker assembly and an electronic device.

Description of Related Art

In response to the development of communications technologies, thinned terminals are becoming popular. The design of an upper speaker affects the thickness of the terminals. The upper speaker may be used as an earpiece during a call, and may be used as an audio power amplifier to form a stereo sound with a lower speaker, so as to improve the sound quality and enhance the user experience. In the related art, a support of the upper speaker is fixed to a housing through a support double-sided tape, and is sealed with the support through a support dust cover assembly, a lamination thickness between the housing and the upper speaker is more than 1.0 mm. If the upper speaker is defined with a relatively large thickness, the laminated structure design results in a relatively large thickness of the whole machine, which conflicts with the lightweight design of terminals.

SUMMARY OF THE INVENTION

According to a first aspect, an embodiment of this application provides a speaker assembly, including:

a housing, where a first sound outlet and a first accommodating groove are provided on the housing, and the first sound outlet is in communication with the first accommodating groove through a sound output channel;

a support mounted to the housing, where at least a portion of the support is disposed in the first accommodating groove, a second accommodating groove is provided at a side of the support away from the first sound outlet, a first opening is provided at a side of the support close to the first sound outlet, and the second accommodating groove is in communication with the sound output channel through the first opening; and a speaker, mounted to the support, where at least a portion of the speaker is disposed in the second accommodating groove, the speaker has a second sound outlet, and the second sound outlet is in communication with the first opening.

According to a second aspect, an embodiment of this application further provides an electronic device, including the above speaker assembly.

BRIEF DESCRIPTION OF THE DRAWINGS

To describe technical solutions in embodiments of this application more clearly, the following briefly introduces accompanying drawings required for describing the embodiments of this application. Apparently, the accompanying drawings in the following description show merely some embodiments of this application, and a person of ordinary skill in the art may still derive other accompanying drawings according to the accompanying drawings without creative efforts.

Figure 1:
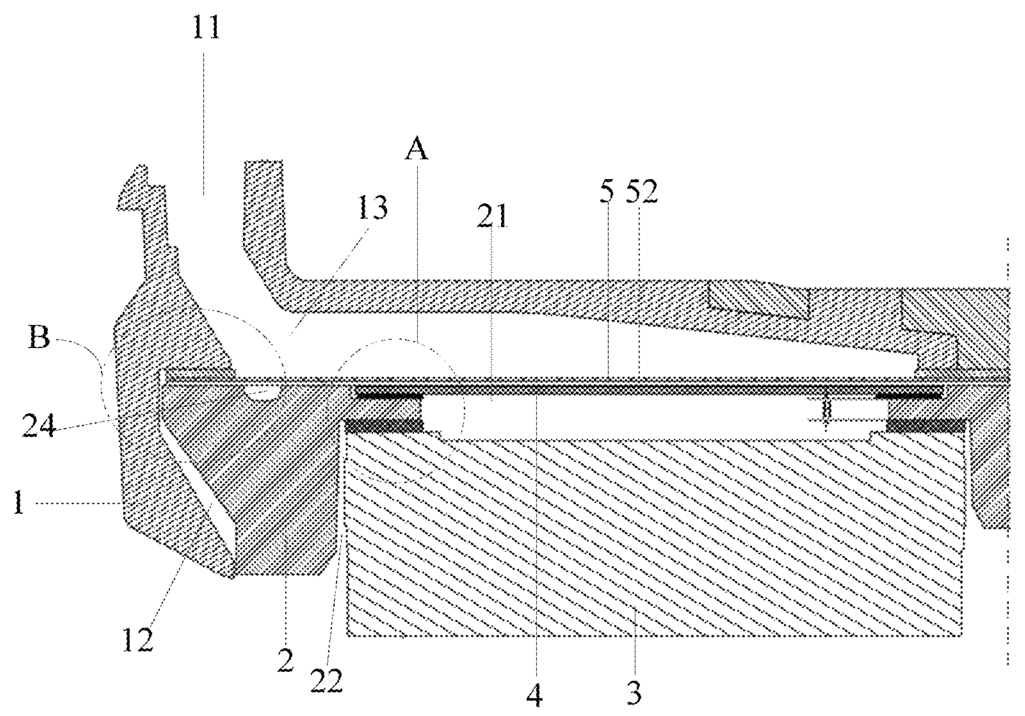
FIG. 1 is a cross-sectional view of a speaker assembly according to an embodiment of this application.

Reference numerals: 1. Housing, 2. Support, 3. Speaker, 4. Supporting member, 5. Dust cover, 11. First sound outlet, 12. First accommodating groove, 13. Sound output channel, 21. First opening, 22. Second accommodating groove, 23. Third accommodating groove, 24. Dust collecting slot, 25. Support double-sided tape, 31. Speaker double-sided tape, 41. Connecting member, 51. First through hole, 52. Dust cover double-sided tape.

DESCRIPTION OF THE INVENTION

Exemplary embodiments of this application are described in detail below with reference to the accompanying drawings. Although the exemplary embodiments of this application are shown in the accompanying drawings, it is to be understood that, this application may be implemented in various manners and should not be limited by the embodiments set forth herein. Conversely, the embodiments are provided to understand this application more thoroughly, and convey the scope of this application to a person skilled in the art.

Figure 4:
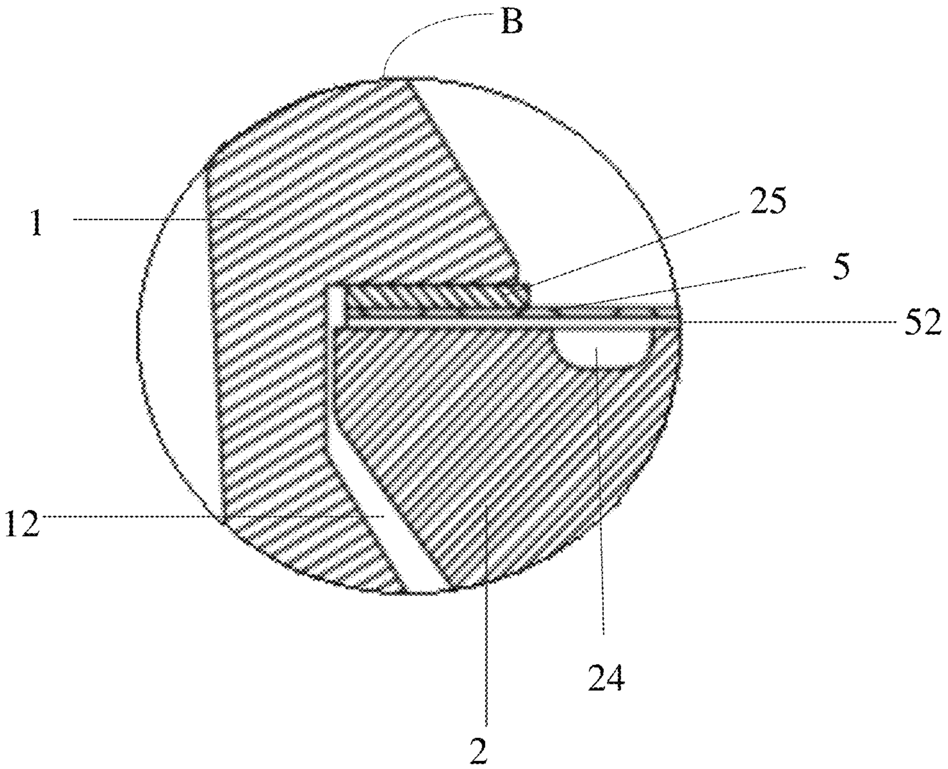
FIG. 4 is a schematic diagram of a part B in FIG. 1 according to an embodiment of this application.

As shown in FIG. 1 and FIG. 4, an embodiment of this application provides a speaker assembly, including:

a housing 1, where a first sound outlet 11 and a first accommodating groove 12 are provided on the housing 1, where the first sound outlet 11 is in communication with the first accommodating groove 12 through a sound output channel 13;

a support 2 mounted to the housing 1, where at least a portion of the support 2 is disposed in the first accommodating groove 12, a second accommodating groove 22 is provided at a side of the support 2 away from the first sound outlet 11, a first opening 21 is provided at a side of the support 2 close to the first sound outlet 11, and the second accommodating groove 22 is in communication with the sound output channel 13 through the first opening 21; and a speaker 3 mounted to the support 2, where at least a portion of the speaker 3 is disposed in the second accommodating groove 22, the speaker 3 has a second sound outlet, and the second sound outlet is in communication with the first opening 21.

Figure 3:
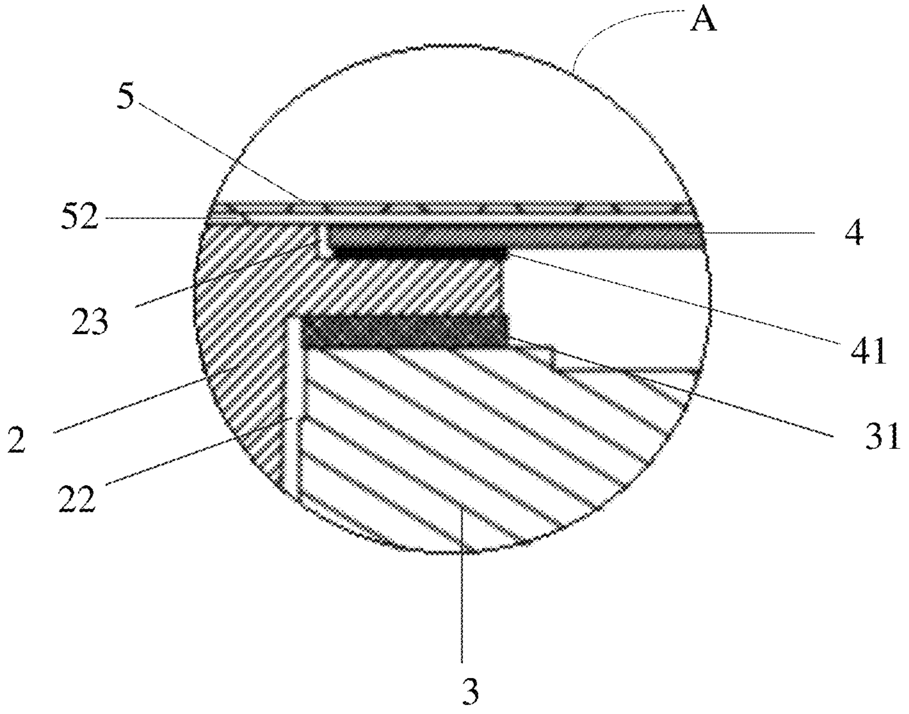
FIG. 3 is a schematic diagram of a part A in FIG. 1 according to an embodiment of this application.

In this embodiment, the housing 1 of the speaker assembly is provided with the first sound outlet 11. The first sound outlet 11 is a sound outlet of a receiver of an electronic device, and is displayed on a surface of a housing of the electronic device. A sound emitted from the receiver is transmitted through the first sound outlet 11. The first accommodating groove 12 is arranged inside the housing 1 for mounting the speaker 3 and the support 2 configured to fix the speaker 3. A part A and a part B in FIG. 1 are shown in FIG. 3 and FIG. 4. The support 2 may be fixed to an inner surface of the first accommodating groove 12 through a support double-sided tape 25.

The support 2 has a second accommodating groove 22 for mounting the speaker 3. That is to say, at least a portion of the speaker 3 is fixed in the second accommodating groove 22. As shown in FIG. 3, the speaker 3 may be fixed to an inner surface of the second accommodating groove 22 through a speaker double-sided tape 31. A side of the support 2 close to the first sound outlet 11 is provided with a first opening 21. The first opening 21 is in communication with the second accommodating groove 22, and the first opening 21 is in communication with the first sound outlet 11 through the sound output channel 13. In this way, the second accommodating groove 22, the first opening 21, the sound output channel 13, and the first sound outlet 11 are formed into a communicated space. The speaker 3 in the second accommodating groove 22 emits a sound through the second sound outlet, which is transmitted to the first sound outlet 11 through the first opening 21 and the sound output channel 13, and is then transmitted out of the electronic device through the first sound outlet 11.

Optionally, the speaker double-sided tape 31 may be a strong/weak tape defined with a thickness in a range of 0.05 mm to 0.15 mm. The weak tape surface faces the speaker 3, and the speaker 3 is hermetically fixed to the support 2 through the speaker double-sided tape 31.

In this embodiment, the first accommodating groove is arranged inside the housing of the speaker assembly, the support having the speaker mounted thereto is arranged in the first accommodating groove, the speaker is mounted in the second accommodating groove of the support, the sound emitted by the speaker is transmitted out from the electronic device through the first opening, the sound output channel, and the first sound outlet. Not only the audio demand and reliability are satisfied, but also the environment of the front chamber of the speaker can be improved in a limited space, which reduces the space of a stack thickness, and satisfies the demand for thinness and lightweight of terminals.

Optionally, the speaker assembly further includes a dust cover 5. The dust cover 5 is connected to the support 2 and disposed at a side of the first opening 21 close to the first sound outlet 11. In this way, the dust entering through the first sound outlet 11 can be prevented from falling into the speaker 3 and affecting the sound quality. As shown in FIG. 1, the dust cover 5 may be fixed to a side surface of the support 2 close to the first sound outlet 11 through a dust cover double-sided tape 52.

Optionally, the speaker assembly further includes a supporting member 4. The supporting member 4 is located between the support 2 and the dust cover 5. The supporting member 4 is connected to the support 2. The supporting member 4 covers a portion area of the first opening 21.

The supporting member 4 is arranged on the side of the first opening 21 close to the first sound outlet 11, and covers a part of the area of the first opening 21. Since the second accommodating groove 22 is arranged on the side of the first opening 21 away from the first sound outlet 11, and the speaker 3 is mounted in the second accommodating groove 22, the supporting member 4 can prevent components above the first opening 21 such as the dust cover 5 from sinking, thereby preventing damage to the speaker 3, and can prevent the components above the first opening 21 from sinking and contacting a diaphragm of the speaker 3 and causing noise.

Figure 2:
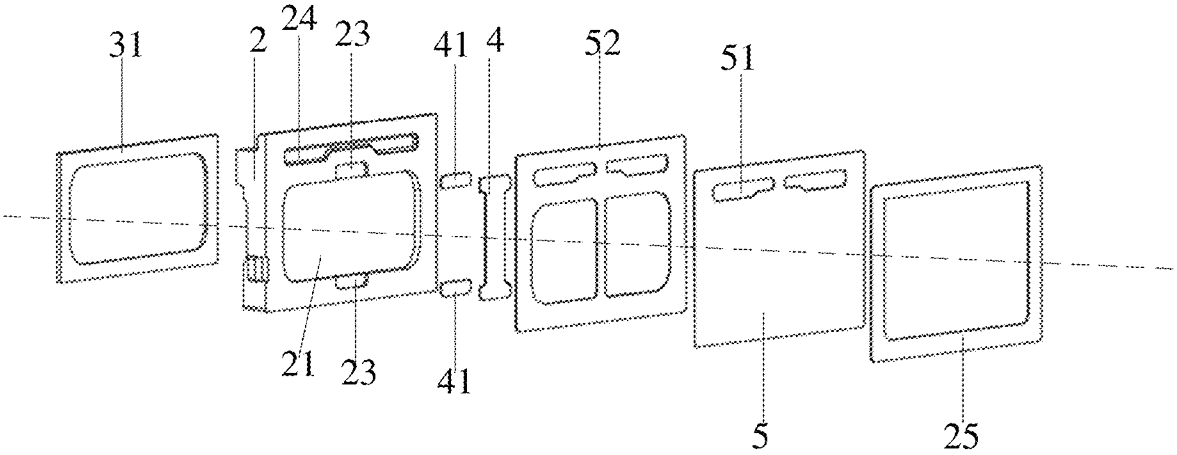
FIG. 2 is an exploded view of the speaker assembly according to an embodiment of this application.

As shown in FIG. 1 and FIG. 2, a third accommodating groove 23 is disposed at the side of the support 2 close to the first sound outlet 11. The third accommodating groove 23 is in communication with the first opening 21. An end of the supporting member 4 extends into the third accommodating groove 23 and is connected to the third accommodating groove 23.

The third accommodating groove 23 is a mounting groove for the supporting member 4, which may be arranged at two adjacent positions on two opposite sides of the first opening 21, and is in communication with the first opening 21 to form a slot body with top and side opened. The end of the supporting member 4 is fixed in the third accommodating groove 23. Optionally, the position of the third accommodating groove 23 on the side of the first opening 21 may be set as required. In order to ensure the most effective supporting by the supporting member 4, as shown in FIG. 3, the third accommodating groove 23 is arranged at a middle position of the side of the first opening 21.

There are two third accommodating grooves 23 disposed opposite to each other. Each of the third accommodating grooves 23 is in communication with the first opening 21, and each of the two ends of the supporting member 4 extends into a corresponding third accommodating groove 23.

Both ends of the supporting member 4 are fixed in the two opposite third accommodating grooves 23, respectively. Optionally, in order to ensure the most effective supporting by the supporting member 4, the two third accommodating grooves 23 are disposed at the middle positions of the two opposite sides of the first opening 21, respectively.

Optionally, as shown in FIG. 2, the supporting member 4 includes a first connection portion, a second connection portion, and a supporting portion. The first connection portion and the second connection portion are respectively fixed in the two third accommodating grooves 23 through connecting members 41, and the supporting portion is suspended. The first connection portion is configured to be fixedly connected to the third accommodating groove 23, and at least a portion part of the first connection portion extends into the third accommodating groove 23. The second connection portion is configured to be fixedly connected to the third accommodating groove 23 on the other opposite side, and at least a portion of the second connection portion extends into the third accommodating groove 23 on the other side. The supporting portion is connected to the first connection portion and the second connection portion. The supporting portion is suspended at the side of the first opening 21 close to the first sound outlet 11 to support the dust cover 5. The supporting member 4 may be a stainless steel sheet, which can realize more effective support and has high stability and reliability.

The connecting members 41 are configured to realize fixed connection between the first connection portion and the second connection portion and the third accommodating grooves 23. The connecting members may be supporting member double-sided tapes. Each of the first connection portion and the second connection portion is provided with one connecting member 41. The third accommodating groove 23 may be defined with a depth in a range of 0.14 mm to 0.22 mm, the supporting member 4 may be defined with a thickness in a range of 0.05 mm to 0.15 mm, the connecting member 41 may be defined with a thickness in a range of 0.04 mm to 0.06 mm, and the support 2 may be defined with a thickness H in a range of 0.35 mm to 0.45 mm. In this way, the lightweight design of the whole machine can be realized, and the thickness space can be effectively reduced.

The connection structure among the dust cover 5, the dust cover double-sided tape 52, the supporting member 4, the connector 41, and the third accommodating groove 23 is shown in FIG. 3. FIG. 3 is an enlarged view of the part A in FIG. 1. At least a portion of the speaker 3 is disposed in the second accommodating groove 22, and the speaker 3 is fixedly connected to the support 2 through the speaker double-sided tape 31. The first connection portion of the supporting member 4 extends into the third accommodating groove 23, and is fixed in the third accommodating groove 23 through the connecting member 41. The supporting member 4 is located between the support 2 and the dust cover 5. The dust cover 5 is fixedly connected to the supporting member 4 through the dust cover double-sided tape 52.

It should be noted that the support double-sided tape 25, the speaker double-sided tape 31, and the dust cover double-sided tape 52 in this embodiment of this application may be connecting members in other forms. In this embodiment of this application, the double-sided tape is used as an example.

As shown in FIG. 1 and FIG. 2, a dust collecting slot 24 is disposed in a surface of the support 2 facing the first sound outlet 11, and an orthographic projection of the first sound outlet 11 covers at least a portion of the dust collecting slot 24. The dust collecting slot 24 is configured to accommodate dust entering through the first sound outlet 11. The dust collecting slot 24 is required to be arranged at a position corresponding to a position where the first sound outlet 11 is communicated with the sound output channel 13. That is to say, the orthographic projection of the first sound outlet 11 on the side surface of the support 2 close to the first sound outlet 11 at least partially covers at least a portion of the dust collecting slot 24, so that the dust entering through the first sound outlet 11 falls into the dust collecting slot 24 through the sound output channel 13. The dust can be deposited in the dust collecting slot 24, which reduces the dust entering the receiver, thereby alleviating the problem about noise caused by the accumulated dust after long-term use.

The dust collecting slot 24 may be arranged along a side of the first opening 21, that is, the dust collecting slot 24 extends along a side of the speaker 3 such that the dust collecting slot 24 is in a strip shape. Optionally, a length of the dust collecting slot 24 may be the same as that of the adjacent side of the first opening 21, so that more dust entering through the first sound outlet 11 can fall into the dust collecting slot 24, thereby reducing the dust entering the second accommodating groove 22 and avoiding noise caused by the dust. Optionally, a depth of the dust collecting slot 24 is greater than and equal to 0.2 mm.

The direct connection structure among the housing 1, the support 2, the support double-sided tape 25, the dust cover 5, the dust cover double-sided tape 52, and the first accommodating groove 12 is shown in FIG. 4. FIG. 4 is an enlarged view of the part B in FIG. 1. The support 2 is disposed in the first accommodating groove 12. The dust cover 5 is fixedly arranged on the side surface of the support 2 close to the first sound outlet 11 through the dust cover double-sided tape 52, and the dust cover 5 is fixedly connected to the housing 1 through the support double-sided tape 25. As shown in FIG. 4, the dust collecting slot 24 is further provided on the side of the support 2 close to the first sound outlet 11, so that the dust entering through the first sound outlet 11 can fall into the dust collecting slot 24.

As shown in FIG. 2, a first through hole 51 is disposed on the dust cover, and an orthographic projection of the first sound outlet 11 covers at least a portion of the first through hole 51. The first through hole 51 is configured for passage of dust. The dust entering through the first sound outlet 11 falls into the dust collecting slot 24 through the sound output channel 13 and the first through hole 51.

It should be noted that a projection of the first through hole 51 on the dust cover 5 on the support 2 overlaps the dust collecting slot 24, so that dust can fall into the dust collecting slot 24. The dust cover 5 is fixedly connected to the side surface of the support 2 close to the first sound outlet 11 through the dust cover double-sided tape 52. Therefore, the dust cover double-sided tape 52 also needs to be provided with holes corresponding to the dust collecting slot 24 and the first through hole 51 to ensure that the dust falls into the first through hole 51.

Optionally, the dust cover 5 and the dust cover double-sided tape 52 may be constructed in an assembly through die cutting. After the supporting member 4 is assembled, the dust cover 5 is assembled and is fixed to the support 2 through the dust cover double-sided tape 52. The dust cover double-sided tape 52 needs to be provided with a double-sided tape bonding position at a position corresponding to the supporting member 4, so that the supporting member 4 can be bonded to the dust cover 5, which can prevent loosening of the supporting member 4 during use.

After the dust cover 5 is assembled, the support double-sided tape 25 is assembled, and a support assembly obtained after the assembling is fixed to the housing 1 through the support double-sided tape 25. The support assembly may include the speaker double-sided tape 31, the support 2, the supporting member double-sided tape, the supporting member 4, the dust cover double-sided tape 52, the dust cover 5, and the support double-sided tape 25. A thickness of the support double-sided tape 25 may be 0.1 mm, and a lamination thickness of 0.75 mm can be realized between the housing 1 and the speaker 3 in this embodiment of this application, which is at least 0.25 mm lower than a traditional lamination thickness, so that the thickness space is effectively reduced, thereby realizing the lightweight of the whole machine.

Optionally, as shown in FIG. 1, a receiver decorative cover is arranged at the first sound outlet 11. A part of the receiver decorative cover is exposed on a housing surface of the electronic device, which can protect the first sound outlet 11 and ensure a pleasing appearance.

In this embodiment of this application, the dust cover is assembled between the support and the housing, and the supporting member is arranged at the middle position between the dust cover and the support, to prevent the dust cover from sinking and contacting the diaphragm of the speaker and causing noise. The speaker may be fixed to the support through a strong/weak tape. A thickness of the strong/weak tape may be 0.1 mm, so that the front chamber environment can be improved in a limited space, the thickness lamination space can be reduced, and the demand for lightweight and thinness of the whole machine can be satisfied.

An embodiment of this application further provides an electronic device, including the above speaker assembly. The electronic device may be a mobile phone. Those skilled in the art may understand that, in addition to the mobile phone as a terminal device, other electronic devices having a speaker assembly are also applicable, such as a tablet computer, an e-book reader, a moving picture experts group audio layer III (Moving Picture Experts Group Audio Layer III, MP3) player, a moving picture experts group audio layer IV (Moving Picture Experts Group Audio Layer IV, MP4) player, a laptop computer, an on-board computer, a desktop computers, a set-top box, a smart television, and a wearable device, which all fall within the protection scope of the embodiments of this application.

The embodiments herein are described in a progressive manner, and each embodiment usually focuses on differences from other embodiments. For the same or similar content in one embodiment, reference may be made to another embodiment.

Although some exemplary embodiments of this application have been described, persons skilled in the art can make changes and modifications to these embodiments once they learn the basic inventive concept. Therefore, the following claims are intended to be construed as to cover the exemplary embodiments and all changes and modifications falling within the scope of this application.

At last, it should be noted that the relational terms herein such as first and second are used only to differentiate an entity or operation from another entity or operation, and do not require or imply any actual relationship or sequence between these entities or operations. Moreover, the terms “include”, “comprise,” and any variation thereof are intended to cover a non-exclusive inclusion. Therefore, in the context of a process, a method, an object, or a device that includes a series of elements, the process, method, object, or device not only includes such elements, but also includes other elements not specified expressly, or may include inherent elements of the process, method, object, or device. Unless otherwise specified, an element limited by “include a/an . . . ” does not exclude other same elements existing in the process, method, object, or terminal device that includes the element.

The foregoing descriptions are merely exemplary implementations of this application. A person of ordinary skill in the art may further make several improvements and modifications without departing from the principle of this application, and the improvements and modifications fall within the protection scope of this application.

What is claimed is:

1. A speaker assembly, comprising:

a housing, wherein a first sound outlet and a first accommodating groove are provided on the housing, and the first sound outlet is in communication with the first accommodating groove through a sound output channel;

a support mounted to the housing, wherein at least a portion of the support is disposed in the first accommodating groove, a second accommodating groove is disposed at a side of the support away from the first sound outlet, a first opening is disposed at a side of the support close to the first sound outlet, and the second accommodating groove is in communication with the sound output channel through the first opening; and a speaker mounted to the support, wherein at least a portion of the speaker is disposed in the second accommodating groove, the speaker has a second sound outlet, and the second sound outlet is in communication with the first opening; and the speaker assembly further comprising a dust cover and a supporting member; wherein the dust cover is connected to the support and disposed at a side of the first opening close to the first sound outlet, and the supporting member is located between the support and the dust cover, the supporting member is connected to the support, and the supporting member covers a portion area of the first opening; wherein a third accommodating groove is disposed at the side of the support close to the first sound outlet, the third accommodating groove is in communication with the first opening, and one end of the supporting member extends into the third accommodating groove and is connected to the third accommodating groove.

2. The speaker assembly according to claim 1, wherein there are two third accommodating grooves disposed opposite to each other, each of the third accommodating grooves is in communication with the first opening, and each of two ends of the supporting member extends into a corresponding third accommodating groove.

3. The speaker assembly according to claim 2, wherein the supporting member comprises a first connection portion, a second connection portion, and a supporting portion, the first connection portion and the second connection portion are respectively fixed in the two third accommodating grooves through connecting members, and the supporting portion is suspended.

4. The speaker assembly according to claim 1, wherein a dust collecting slot is disposed in a surface of the support facing the first sound outlet, and an orthographic projection of the first sound outlet covers at least a portion of the dust collecting slot.

5. The speaker assembly according to claim 4, wherein the dust collecting slot extends along a side of the speaker such that the dust collecting slot is in a strip shape.

6. The speaker assembly according to claim 1, wherein a first through hole is disposed on the dust cover, and an orthographic projection of the first sound outlet covers at least a portion of the first through hole.

7. An electronic device, comprising the speaker assembly, wherein the speaker assembly comprises:

a housing, wherein a first sound outlet and a first accommodating groove are provided on the housing, and the first sound outlet is in communication with the first accommodating groove through a sound output channel;

a support mounted to the housing, wherein at least a portion of the support is disposed in the first accommodating groove, a second accommodating groove is disposed at a side of the support away from the first sound outlet, a first opening is disposed at a side of the support close to the first sound outlet, and the second accommodating groove is in communication with the sound output channel through the first opening; and a speaker mounted to the support, wherein at least a portion of the speaker is disposed in the second accommodating groove, the speaker has a second sound outlet, and the second sound outlet is in communication with the first opening; wherein the speaker assembly further comprises a dust cover and a supporting member; wherein the dust cover is connected to the support and disposed at a side of the first opening close to the first sound outlet, and the supporting member is located between the support and the dust cover, the supporting member is connected to the support, and the supporting member covers a portion area of the first opening; wherein a third accommodating groove is disposed at the side of the support close to the first sound outlet, the third accommodating groove is in communication with the first opening, and one end of the supporting member extends into the third accommodating groove and is connected to the third accommodating groove.

8. The electronic device according to claim 7, wherein there are two third accommodating grooves disposed opposite to each other, each of the third accommodating grooves is in communication with the first opening, and each of two ends of the supporting member extends into a corresponding third accommodating groove.

9. The electronic device according to claim 8, wherein the supporting member comprises a first connection portion, a second connection portion, and a supporting portion, the first connection portion and the second connection portion are respectively fixed in the two third accommodating grooves through connecting members, and the supporting portion is suspended.

10. The electronic device according to claim 7, wherein a dust collecting slot is disposed in a surface of the support facing the first sound outlet, and an orthographic projection of the first sound outlet covers at least a portion of the dust collecting slot.

11. The electronic device according to claim 10, wherein the dust collecting slot extends along a side of the speaker such that the dust collecting slot is in a strip shape.

12. The electronic device according to claim 7, wherein a first through hole is disposed on the dust cover, and an orthographic projection of the first sound outlet covers at least a portion of the first through hole.

* * * * *